United States Patent
Ganser et al.

(10) Patent No.: US 6,550,856 B1
(45) Date of Patent: Apr. 22, 2003

(54) VEHICLE SEAT

(75) Inventors: Antje Ganser, Renningen (DE); Alexander Koblischke, Renningen-Malmsheim (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/664,963

(22) Filed: Sep. 17, 2000

(30) Foreign Application Priority Data

Sep. 17, 1999 (DE) .......................................... 199 44 719

(51) Int. Cl.$^7$ ................................................ A47C 1/02
(52) U.S. Cl. ......................... 297/61; 297/391; 297/410; 297/408; 297/284.1; 297/396; 297/216.12
(58) Field of Search ................................. 297/391, 410, 297/61, 408, 284.1, 396, 216.12

(56) References Cited

U.S. PATENT DOCUMENTS

| | | | | |
|---|---|---|---|---|
| 2,636,552 A | * | 4/1953 | Long ..................... 297/216.12 |
| 3,055,707 A | * | 9/1962 | Spound ...................... 297/409 |
| 4,304,439 A | * | 12/1981 | Terada et al. ............... 297/409 |
| 4,693,515 A | * | 9/1987 | Russo et al. ................. 297/391 |
| 4,840,429 A | * | 6/1989 | Stockl ........................ 297/409 |
| 5,590,929 A | | 1/1997 | Hamelin |
| 5,738,411 A | * | 4/1998 | Sutton et al. .......... 297/378.12 |
| 5,918,940 A | | 7/1999 | Wakamatsu et al. |
| 5,992,937 A | * | 11/1999 | Pinhall ....................... 297/408 |
| 6,082,817 A | * | 7/2000 | Muller .................. 297/216.12 |
| 6,192,565 B1 | | 2/2001 | Tame |
| 6,270,161 B1 | * | 8/2001 | De Filippo ................. 297/410 |
| 6,299,254 B1 | * | 10/2001 | Dinh et al. ................. 297/408 |
| 6,302,485 B1 | * | 10/2001 | Nakane et al. ............. 297/408 |

FOREIGN PATENT DOCUMENTS

| | | | | |
|---|---|---|---|---|
| DE | 33 00 506 A1 | * | 7/1984 | ................. 297/391 |
| DE | 36 38 261 A1 | * | 6/1987 | ............ 297/216.12 |
| EP | 209 417 A | * | 1/1987 | ................. 297/410 |
| EP | 0 471 573 A1 | * | 2/1992 | ................. 297/408 |
| FR | 2708532 A3 | * | 2/1995 | ................. 297/410 |
| JP | 3-540 | * | 3/1991 | ................. 297/408 |
| JP | 4-8310 | * | 4/1992 | ................. 297/408 |

* cited by examiner

Primary Examiner—Lanna Mai
Assistant Examiner—Dennis L. Dorsey
(74) Attorney, Agent, or Firm—MacMillan, Sobanski & Todd, LLC

(57) ABSTRACT

Vehicle seat (1), in particular for a two-door automobile, with a seat back (3) and a headrest (3a, 5, 5a) integrated into the seat back, wherein one section (3a) of a seat-back frame forms a carrying structure of the headrest, and the headrest comprises a cushion carrier part (5) mounted in such a way that it can move with respect to the seat-back frame when the seat back is tilted forward, so that the overall length of the seat back is reduced when tilted forward with respect to the resting position.

17 Claims, 17 Drawing Sheets

⇐ FR

VEHICLE SEAT

BACKGROUND OF THE INVENTION

The invention relates to a vehicle seat, in particular for a two-door automobile.

The seats of modern motor vehicles are known to be equipped with headrests, which in particular are intended to prevent the head from being thrown back, with corresponding injuries to the cervical vertebrae, as a result of head-on collisions or being run into from the rear. In limousines headrests of this kind as a rule are separate components inserted into the seat back.

Especially in sports cars, however, headrests are in many cases fully integrated, being basically a tapered extension of the seat back that often comprises a distinct upholstered section. In order to ensure that these headrests satisfy the safety requirements even for tall drivers, the seat backs with fully integrated headrests frequently reach almost up to the roofliner of the car.

In the case of sports cars, this introduces problems in tilting the seat back forward, as is necessary to allow access to the back seat of automobiles that have such a seat, or to the storage space behind the front seats.

SUMMARY OF THE INVENTION

It is thus the object of the invention to disclose an improved vehicle seat of the generic kind, in which the seat back can be tilted forward without colliding with the roofliner or the sun visor even though the car is of flat construction.

This object is achieved by a vehicle seat comprising the features of claim 1. The invention includes the essential idea of reducing the effective overall length of the seat back while the seat is tilted forward with respect to the resting state of the seat, i.e. the state in which the back is locked in the upright position. It further includes the idea that this reducing or shortening is enabled by providing a separate part of the headrest that is movable with respect to the integrated seat-back structure.

In preferred embodiments of the vehicle seat, this mobility is implemented by a pivoted connection or a sliding connection, in particular with a guide-gate mechanism, or by a combination of the two, disposed between the seat-back frame and the separate headrest part, which in the following will be called the cushion carrier part.

In another preferred embodiment an actuating element is disposed on the seat-back frame or immediately adjacent thereto, which brings about or at least initiates the movement of the cushion carrier part. Embodiments are also possible in which the cushion carrier part is grasped with the hand prior to tilting the seat back forward and is guided manually into the position that makes tilting of the seat back unproblematic, but with the actuating element mentioned above the manual work of the user is reduced and the usefulness of the proposed solution is further enhanced.

The actuating element in a further development of the idea in accordance with the invention is connected to an unlocking element of the seat back in such a way that it responds to disengagement of the seat back and moves the cushion carrier part into the position that enables the seat back to be tilted forward or initiates this movement.

In another, preferred further development the actuating element is associated with the seat-back frame in such a way that it responds to a pivoting movement of the seat back that exceeds a predetermined angular amount. One result is that a movement of the cushion carrier part does not occur when the seat back is displaced within normal limits, and another is that its movement during tilting of the seat back can be controlled in dependence on the angle of inclination, and if desired can be made approximately proportional to the latter.

In order to transmit forces between the actuating element and the mechanism for moving the cushion carrier part, in particular a mechanical traction- or pressure-transmitting element is provided, for instance a Bowden cable or connecting-rod arrangement.

The cushion carrier part is advantageously locked to the seat-back frame in the resting position by a catch connection, which is released in particular by way of the actuating element.

As mentioned above, in special embodiments the movement of the cushion carrier part is not driven, or at least not over the entire movement path, by the actuating element, which instead merely initiates the movement. In one useful further development of these embodiments, the driving element for the movement is a spring element disposed between the seat-back frame and the cushion carrier part, which pushes the cushion carrier part out of the resting position into the position suitable for tilting the seat back forward.

In an embodiment alternative to this one, a spring element is provided to support the movement of the cushion carrier part back into its resting position. In this embodiment the movement out of the resting position into the tilted-seatback position is either mediated by the above-mentioned traction-or pressure-transmitting element or effected manually.

The above-mentioned pivoted connection is constructed in an advantageous embodiment as a linkage connection comprising two axles disposed substantially horizontally in the seat-back frame, about each of which rotates at least one lever the free end of which is attached to the cushion carrier part. When the lever is caused to swivel about the axle by the actuating element, the result is a swiveling (and lowering) of the cushion carrier part. In this case the tension- or pressure-transmitting element that constitutes the connection to the actuating element can act directly at the two axles.

In another development of this embodiment, however, a separate connection can be provided between the swiveling lever or levers on the one axle and the swiveling lever or levers on the other axle, by way of a rod that mediates traction and pressure. This connecting rod transmits every movement of the one lever or pair of levers to the other lever or pair of levers.

In another advantageous embodiment, the seat-back frame and the cushion carrier part are connected to one another by way of a combined pivoting and sliding mechanism, which on the one hand comprises an axle bearing a swiveling lever or pair of such levers and on the other hand comprises a curved guide gate. With this mechanism, the lower end of the cushion carrier part is pivoted away from the seat-back frame, into a lowered position, while the upper end is guided in the curved gate so that in the first segment of its path it moves substantially forward and in a second segment, substantially downward toward the seating surface.

In an aesthetically appealing and therefore preferred embodiment the cushion carrier part is connected to the seat-back frame over substantially the entire outer circumferential region by means of a flexible or foldable cuff, which conceals the mechanical elements by which the movement is driven and even when the cushion carrier part is in the tilted-forward position largely preserves the visual impression of a fully integrated seat-back/headrest unit.

As for the rest, other advantages and useful features of the invention will be apparent from the subclaims and the following description of preferred exemplary embodiments with reference to the drawings.

DETAILED DESCRIPTION OF THE INVENTION

Figure 1:
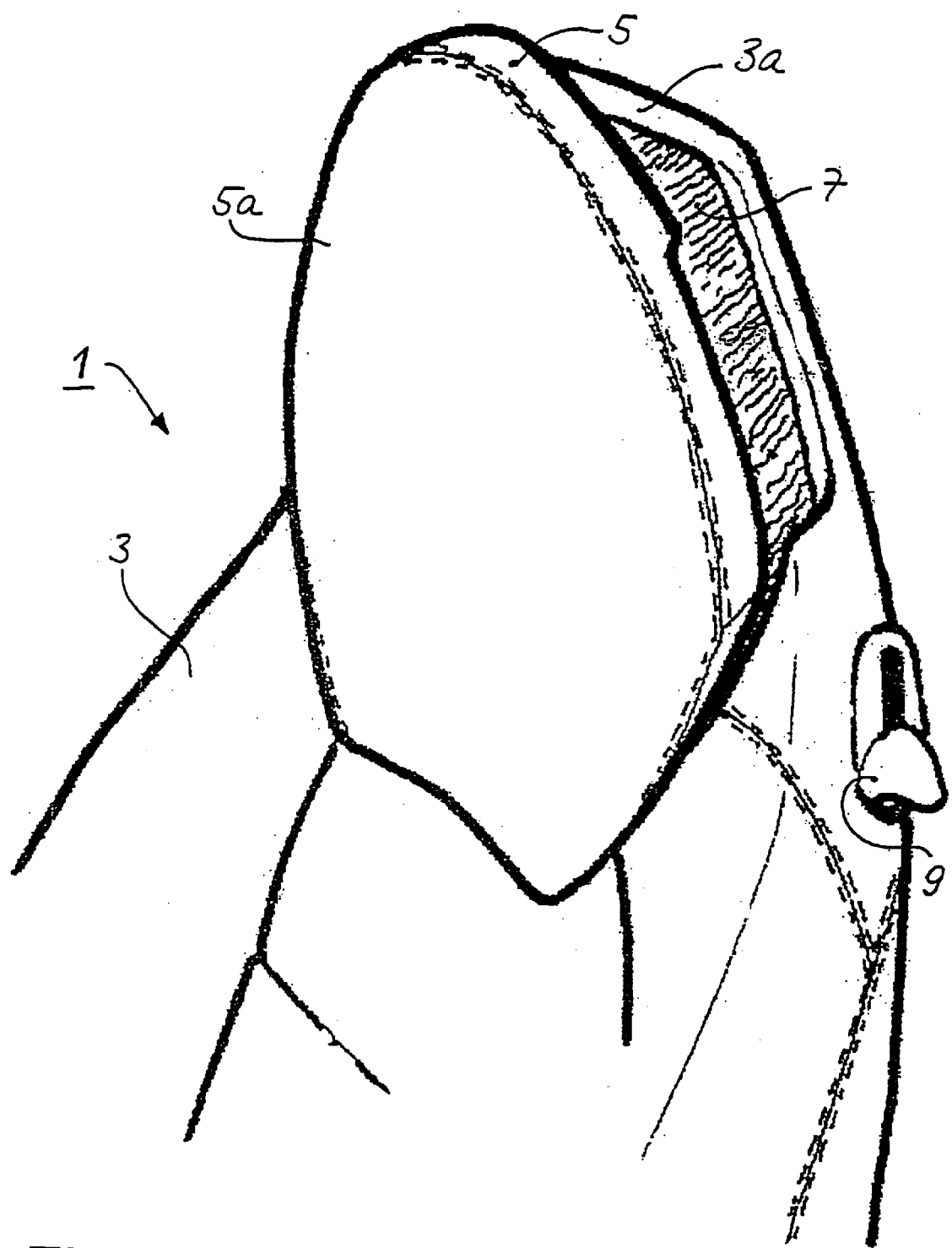
FIG. 1 Is a sketch-like drawing of the headrest section of a vehicle seat back with integrated headrest according to one embodiment of the invention in the position suitable for tilting the seat back forward.

In FIG. 1 the headrest section of a seat back 3 of a vehicle seat 1 is shown in perspective, in the position suitable for tilting the seat back 3 forward. A cushion carrier part 5, which comprises a headrest cushion 5a separate from the upholstery of the rest of the seat, is displaced forward (toward the left in the drawing) and downward with respect to a headrest section 3a of the seat back 3, after the seat back has been disengaged by means of an unlocking lever 9 so as to be tilted forward.

A covering cuff 7, which connects the circumference of the headrest section 3a to that of the cushion carrier part 5, conceals a mechanism described in detail below, which mediates the lowering of the cushion carrier part 5 with respect to the seat back 3.

Figure 2A:
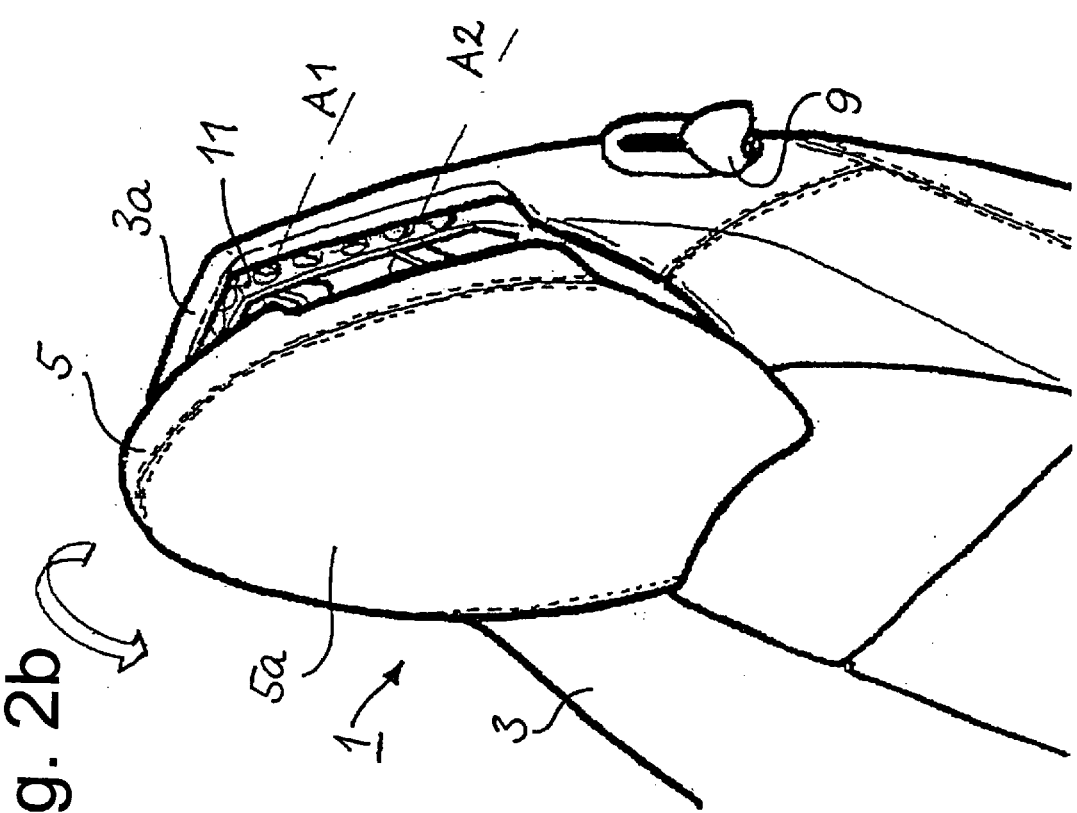
FIGS. 2a and 2b are drawings of the headrest section of the vehicle seat according to FIG. 1 in the resting position and, respectively, in the tilted-forward position with a covering cuff removed.
Figure 2B:
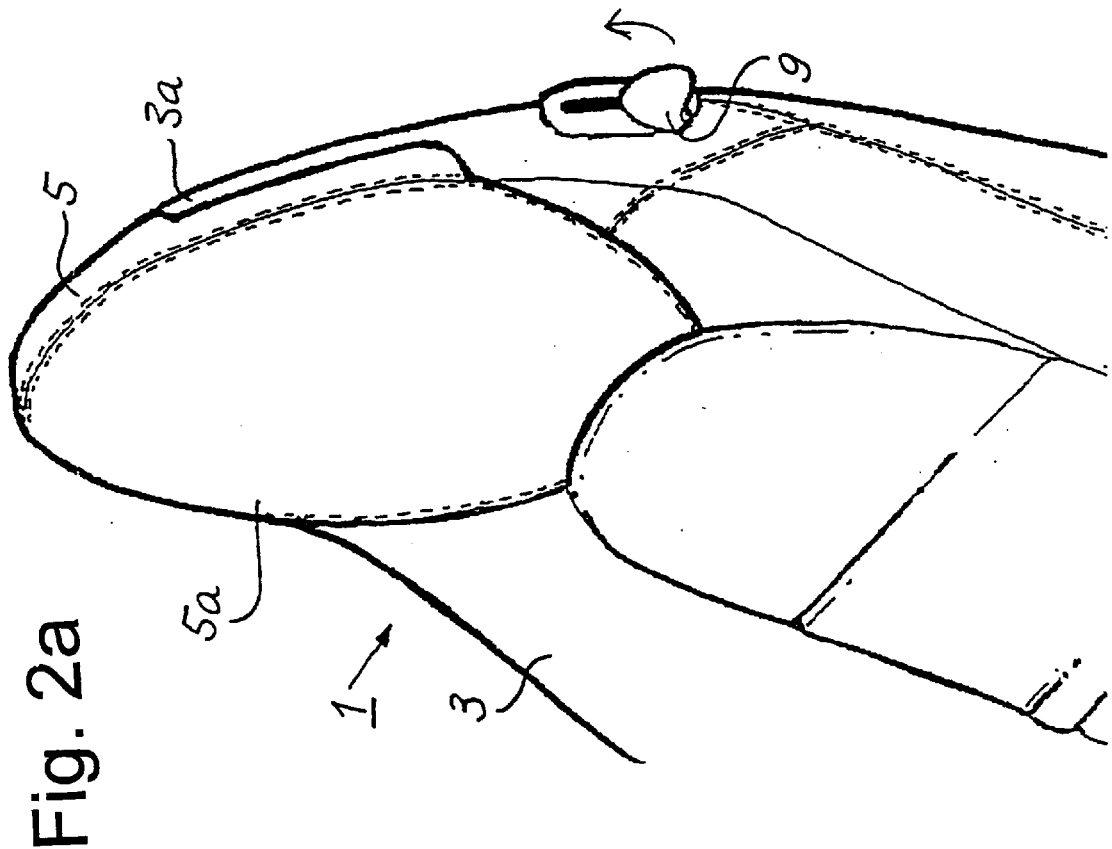

FIGS. 2a and 2b, in drawings corresponding to those of FIG. 1, show the resting state of the vehicle seat 1 with seat back 3 locked upright (FIG. 2a) for comparison with the state in which the seat back is ready to be tilted forward (FIG. 2b). In the drawing of FIG. 2b the covering cuff 7 (FIG. 1) has been removed so that parts of a seat-back frame 11 and additional parts of the mechanism for moving the cushion carrier part 5 can be seen. The dot-dashed lines A1, A2 denote the axes of rotation of two axles in the mechanism for moving the cushion carrier part.

Figure 3A:
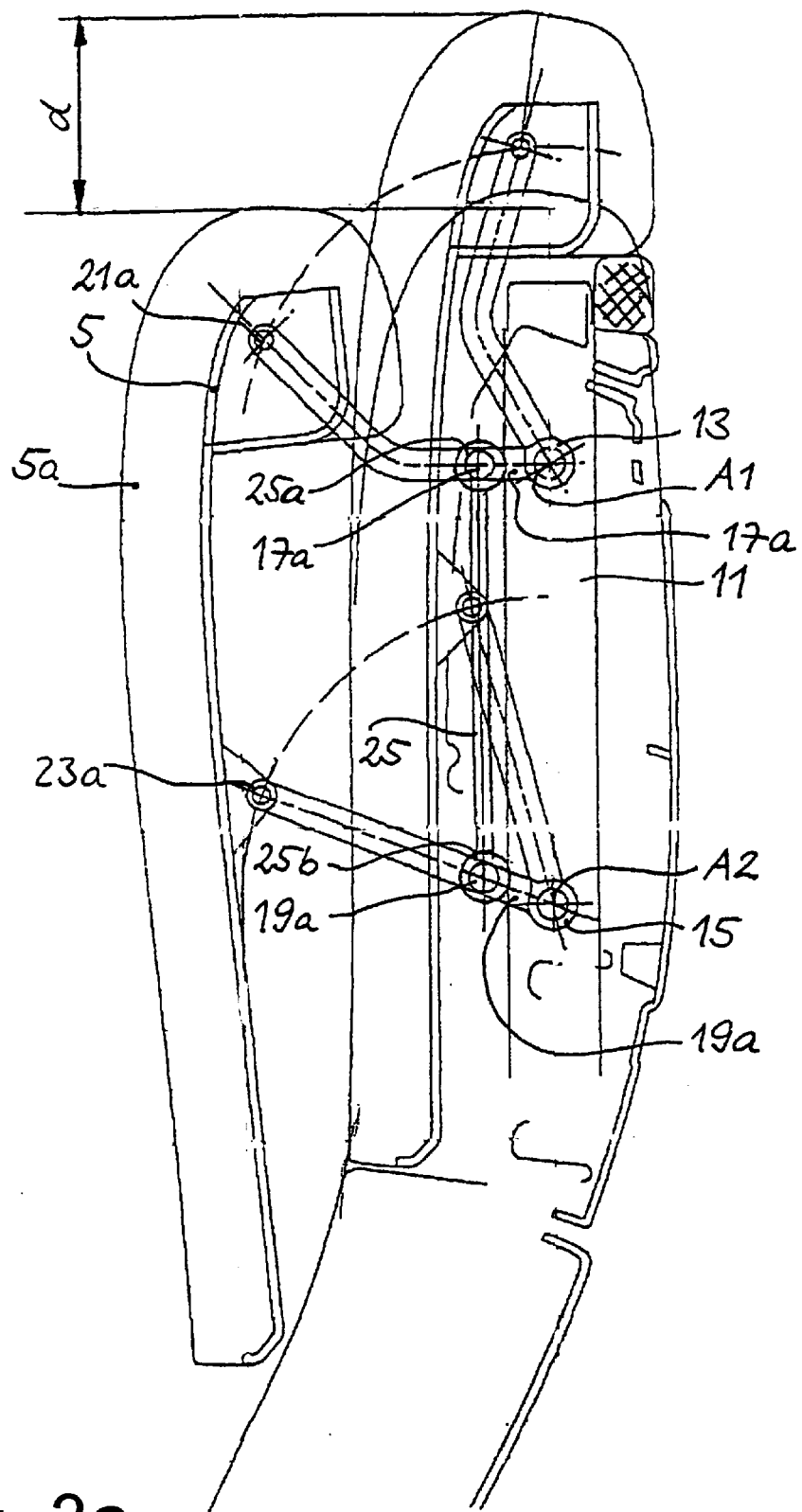
FIGS. 3a and 3b are drawings of the mechanical construction of the headrest section of a vehicle seat according to one embodiment of the invention in resting and tilted-forward position, respectively, as a sectional drawing along a vertical (FIG. 3a) or a horizontal (FIG. 3b) plane of section.
Figure 3B:
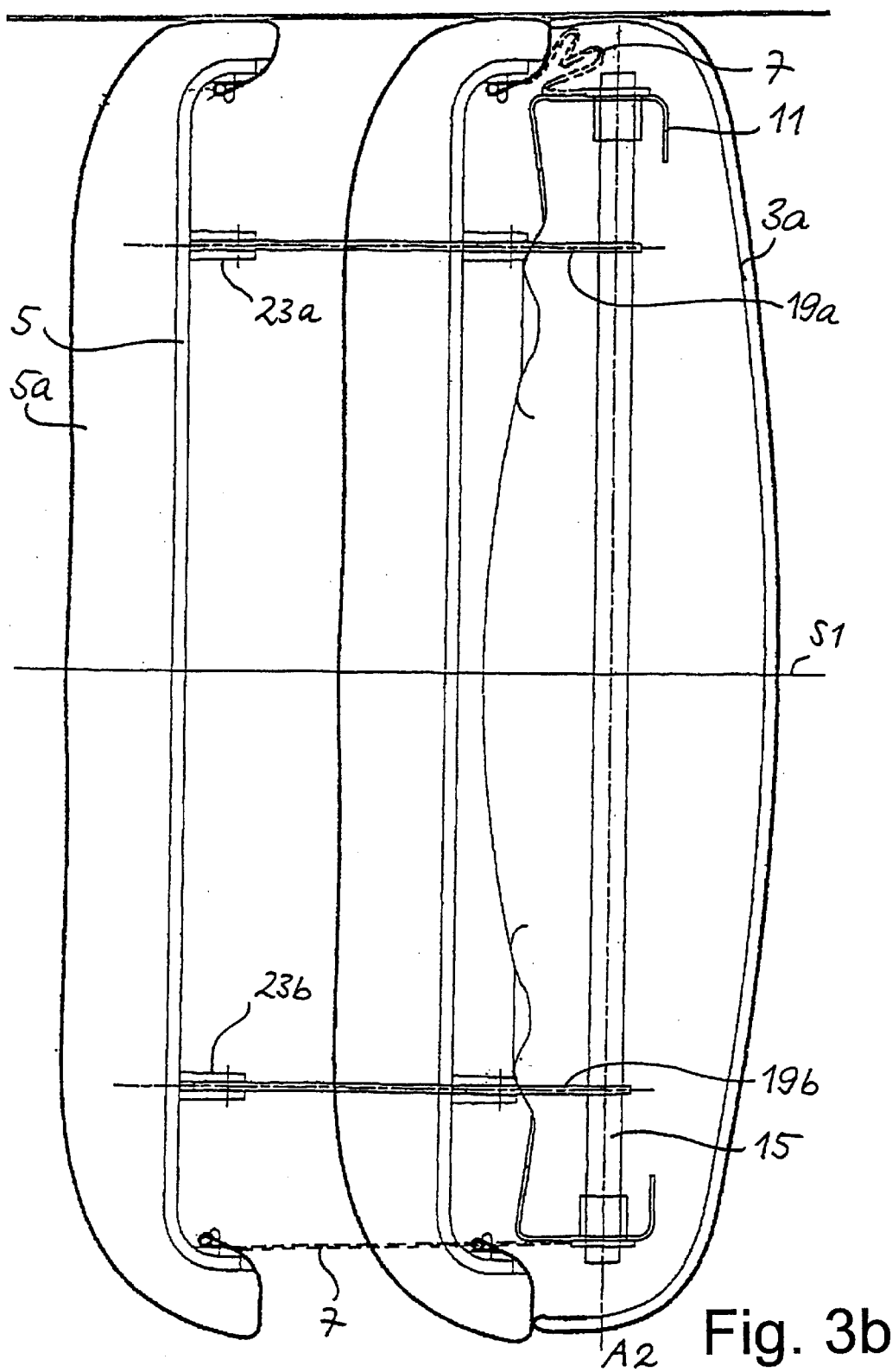

In FIGS. 3a and 3b important parts of this mechanism are shown in both the resting and the tilted-forward position. It can be seen that in the seat-back frame 11 (here shown only in outline) two tubular sections 13, 15 are disposed along the axes of rotation A1, A2, to one of which is welded an angled swivelling lever 17a and to the other, a straight swivelling lever 19a. Both levers 17a, 19a are shown both in the (upper) resting or locked position and in the (lower) tilting-forward position. The free ends of the swivelling levers 17a, 19a are rotatably seated in abutments 21a, 23a on the cushion carrier part 5.

Welded close to the end of each of the levers 17a, 19a that encloses the axis A1, A2 is a pin 17a, 19a, and each of the pins 17a, 19a is retained within an eye 25a, 25b in a connecting rod 25 that extends between the levers 17a, 19a and connects them to one another in such a way that a swivelling movement of one lever is necessarily transmitted to the other. (For clarity, the connecting rod 25 is shown only in the tilting-forward position of the swivelling levers.)

In the cross-sectional drawing of FIG. 3b it can be seen that the tubular section 15 bears two swivelling levers 19a, 19b arranged symmetrically with respect to a vertical midplane S1 of the seat. In an analogous arrangement (not shown here) on the second tubular section 13 are disposed another pair of swivelling levers, of which lever 17a is visible in FIG. 3a. In the upper region of FIG. 3b the covering cuff 7 can be seen in its folded-up state in the resting position, and in the lower region of the figure the covering cuff 7 is shown unfolded and expanded as it appears when the cushion carrier part 5 is in the position ready for tilting forward.

Figure 4A:
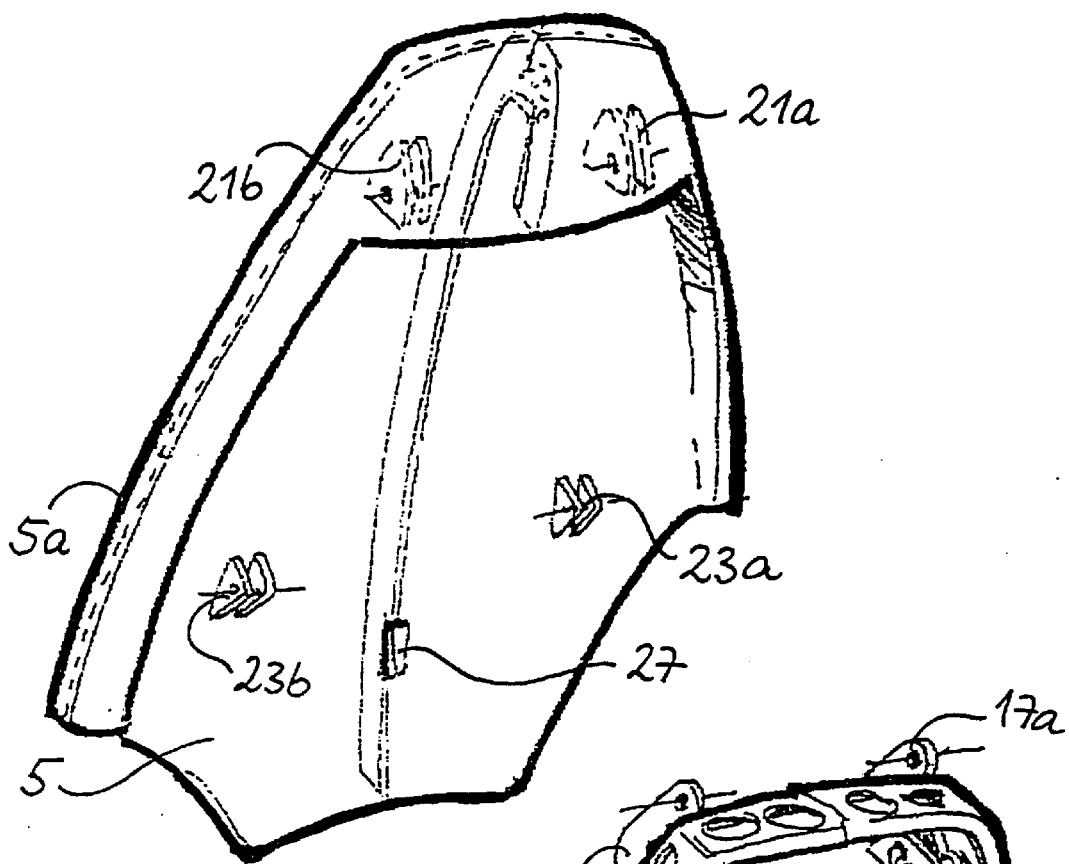
FIGS. 4a to 4c are perspective partial views to explain the mechanical construction of the headrest section of a vehicle seat according to a first embodiment of the invention.
Figure 4B:
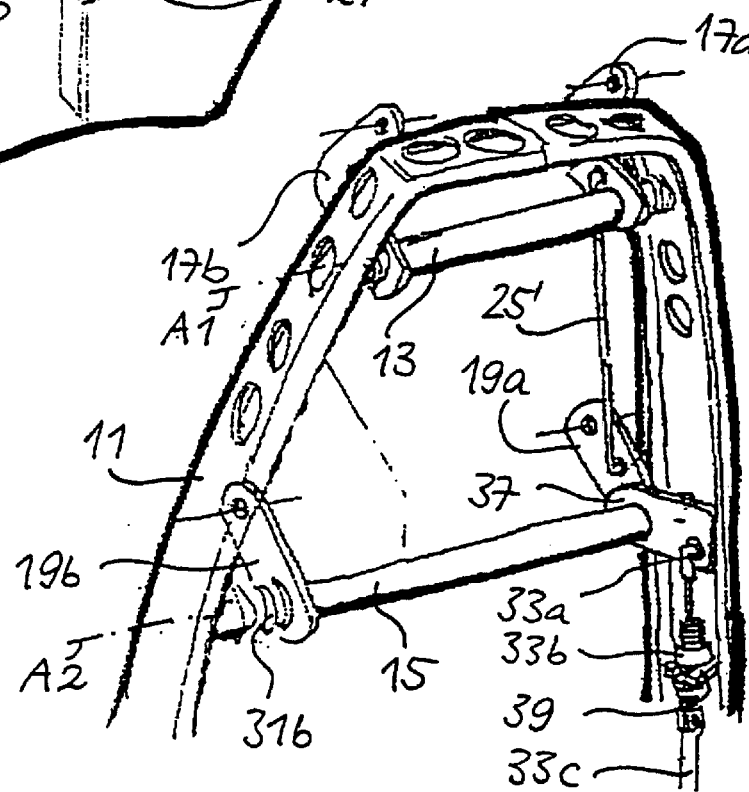
Figure 4C:
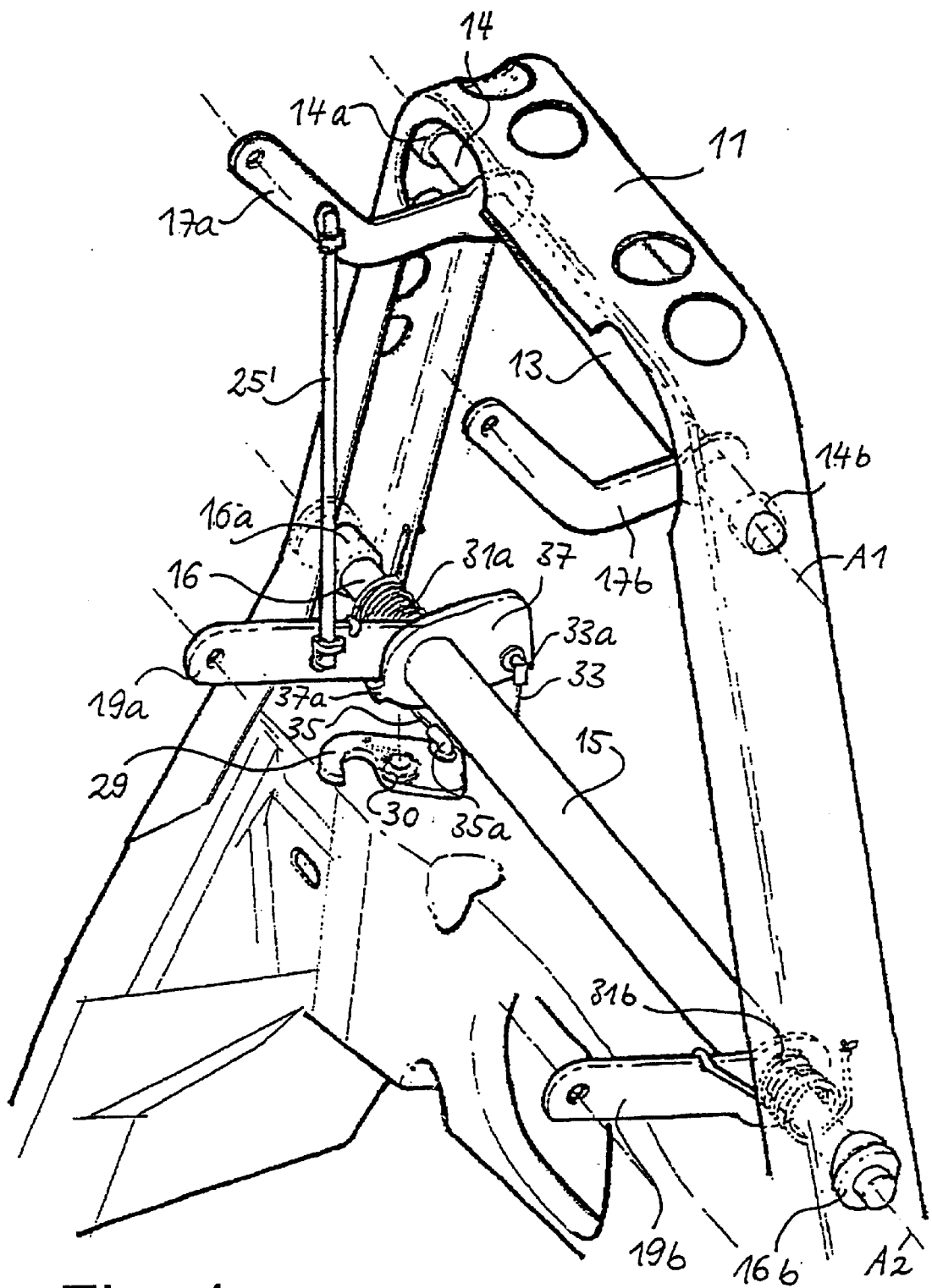

Structure and function of the mechanism shown in FIGS. 3a and 3b are additionally clarified by the perspective drawings in FIGS. 4a to 4c, which show more details of the mechanism in a slightly modified embodiment.

In FIG. 4a the cushion carrier part 5 is first shown in perspective from the back. It is evident that the abutments 21a, 21b and 23a, 23b are each formed as pairs of approximately triangular projections that protrude from the back surface of the cushion carrier part 5. Each comprises an opening (not specially numbered) through which a retention pin (not shown) can be inserted so that when the cushion carrier part 5 is set onto the swivelling levers 17a, 17b and 19a, 19b, the levers are rotatably connected to the abutments 21a, 21b and 23a, 23b respectively.

In the vertical midplane of the cushion carrier part 5, slightly below the abutments 23a, 23b, a retaining hook is formed, which projects backward out of the back surface of the cushion carrier part 5 and serves to engage a retaining clip 29 (FIG. 4c), so that the cushion carrier part 5 is held firmly to the seat-back frame 11 (FIGS. 4b and 4c) in the resting position.

In FIGS. 4b and 4c the parts of the mechanism for moving the cushion carrier part 5 that are disposed in the seat-back frame 11 are shown. These are first, as shown in FIGS. 3a and 3b and discussed above, tubular sections 13, 15, each of which is disposed substantially horizontally on an axle 14 or 16, respectively, so as to rotate about the axes of rotation A1, A2, and upon which are mounted the swivelling levers 17a, 17b and 19a, 19b in a manner fixedly rotating therewith; also visible is a connecting rod 25' (modified from the embodiment according to FIGS. 3a and 3b), which connects the levers 17a and 19a to one another.

It can be seen that each of the swivelling levers 17a, 17b and 19a, 19b comprises near its free end a bore to engage the above-mentioned retention pin for connection to the abutments 21a, 21b and 23a, 23b, respectively, on the cushion carrier part 5. In FIG. 4c it can further be seen that the axles 14, 16 are supported in a manner fixedly rotating therewith in bores (not specially numbered) in the seat-back frame 11 by way of corresponding bushings 14a, 14b or 16a, 16b, respectively.

For each of the swivelling levers 19a, 19b, which here are on the front surface of the tubular section 15, there is provided a torsion spring 31a, 31b coiled coaxially around the axis of rotation A2. Both torsion springs 31a, 31b are fixed by one end to the seat-back frame 11 and with the other end overlap the upper edge of the associated lever 19a or 19b, so as to exert a downward force on the levers. Thus when the mechanism is mounted in the seat, the torsion springs 31a, 31b simultaneously press down the cushion carrier part 5 connected to the swivelling levers, as soon as the engagement between the retaining hook 27 on the cushion carrier part 5 and the retaining clip 29 is released.

As can likewise be seen in FIGS. 4b and 4c, in order to actuate the swivelling levers 19a, 19b and the retaining clip 29, there are provided Bowden cables 33 and 35, respectively. One end 33a of the Bowden cable 33 is inserted into a restoring lever 37, which is disposed on the tubular section 15 and in its region opposite the end 33a of the Bowden cable 33, with respect to the axis of rotation A2, comprises a claw 37a that extends under the lower edge of the swivelling lever 19a. To fix the end 33b of the Bowden cable sheath 33c a Bowden cable holder 39 is attached to the adjacent section of the seat-back frame 11, in which the end 33b of the Bowden cable sheath is suspended in a manner known per se.

As can be seen in FIG. 4c, the retaining clip 29 is so mounted in its middle region that it can rotate about a vertical axis (not specially numbered) against the pretensioning or biasing force exerted by a torsion spring 30, which in the released position acts with respect to the retaining hook 27. At the end of the retaining clip 29 opposite the hooked section, with respect to the said vertical axis of rotation, an end 35a of the Bowden cable 35 is suspended. (The mounting of the retaining clip 29 and the fixation of the sheath of the Bowden cable 35 to the seat-back frame are not shown in FIG. 4c ; however, the appropriate possibilities will be clear to those skilled in the art from the arrangement of the elements.)

The embodiments of a mechanism to move the cushion carrier part 5 shown in FIGS. 3a and 3b and FIGS. 4a to 4c function as follows.

When a force is applied that releases the tension in the Bowden cables 33 and 35, for example by actuating the release lever 9 (FIG. 1 or 2a and 2b), one effect is that the retaining clip 29 is pivoted out of the position in which it engages the retaining hook 27 on the cushion carrier part 5, because of the pretensioning by the torsion spring 29a.

Secondly, the downward force on the swivelling levers 19a, 19b exerted by the torsion springs 31a, 31b coiled about the axis A2 is no longer counteracted by a force exerted by the Bowden cable 33 when it is under tension and mediated by the claw 37a of the restoring lever 37.

Because the retaining apparatus has been disengaged, and under the action of the torsion springs 31a, 31b, by means of the swivelling levers 19a, 19b and the swivelling levers 17a, 17b —which are linked to the former levers by the connecting rod 25' in a parallelogram-like arrangement, together forming a so-called "four-bar linkage"—the cushion carrier part 5 is pressed forward and downward with respect to the seat-back frame 11, into the tilting-forward position shown in FIGS. 1 and 2b.

Now when a pulling force is again applied to the Bowden cables 33, 35, the cushion carrier part 5 is again pivoted upward and backward by means of the four-bar linkage 17a, 17b, 19a, 19b. As can easily be seen in FIGS. 4b and 4c, pulling on the Bowden cable 33 causes the end of the restoring lever 37 into which the end 33a of the Bowden cable is inserted to be pivoted downward.

As a result the claw 37a presses the swivelling lever 19a upward along with the elements linked to it, namely the lever 19b, which is seated on the same tubular section 15, and the swivelling levers 17a, 17b, by way of the connecting rod 25'. By this means the cushion carrier part 5, attached to the swivelling levers, is moved from the tilting-forward position back into the resting position (FIG. 2a).

It will be evident that the release or application of tension to the Bowden cables 33, 35, in particular when the cushion carrier part 5 is to be returned to the locked resting position, is advantageously not quite simultaneous in the two cables. The disengagement of retaining hook 27 and retaining clip 29 precedes the lowering of the cushion carrier part 5, and the re-engagement of these two elements occurs after the cushion carrier part 5 has been completely raised and is apposed to the headrest section of the seat back.

Figure 5A:
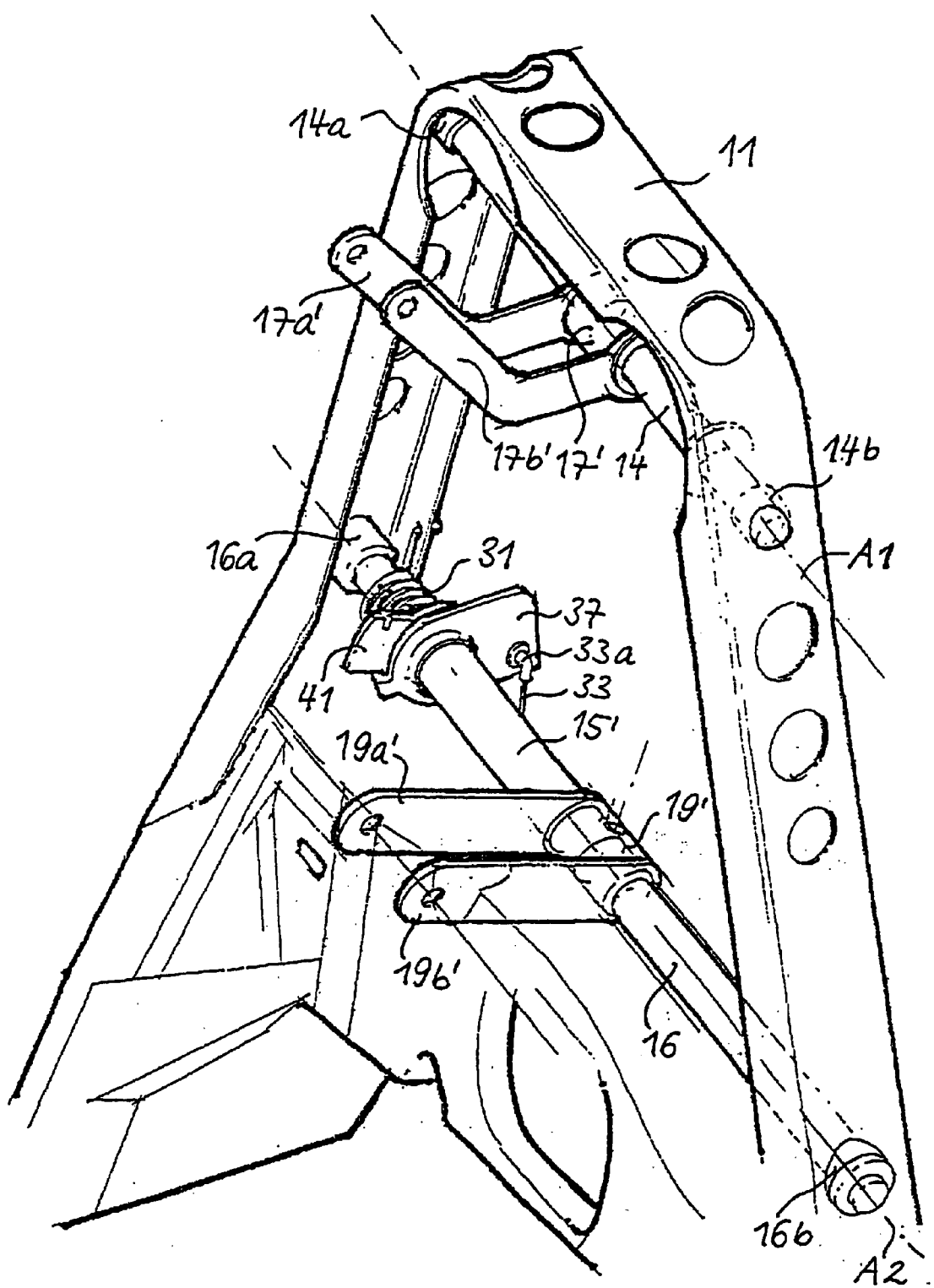
FIGS. 5a and 5b are perspective partial views to explain the mechanical construction of the headrest section of a vehicle seat slightly modified from the embodiment according to FIGS. 4a to 4c, FIGS. 6a to 6c are perspective partial views to explain the mechanical construction of the headrest section of a vehicle seat according to a second embodiment of the invention.
Figure 5B:
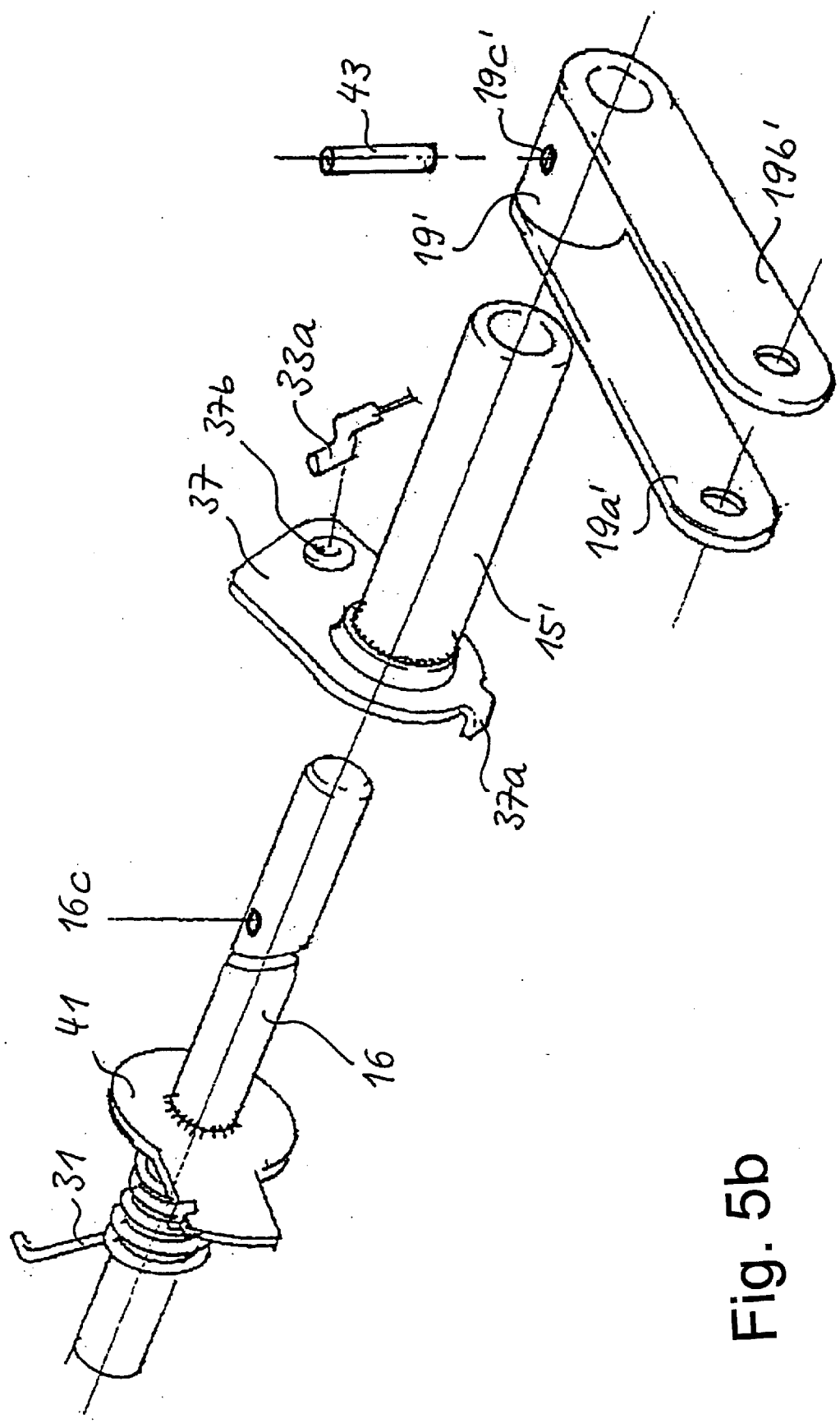

In FIGS. 5a and 5b an embodiment of the swivelling-lever mechanism that has been further modified from the preceding embodiments is sketched. The basic construction and the functional principle are the same as in the embodiments described above, so that most of the reference numerals are the same and the associated components need not be explained again.

This embodiment has a smaller number of individual components, which is advantageous with respect to manufacturing costs.

The substantial differences from the embodiments described above reside in the arrangement of the pairs of swivelling levers such that they are relatively close to one another near the midplane of the seat and each is attached to a compact component, the levers 17a ', 17b' being disposed on a first swivelling-lever part 17' on the first axle 14 and the levers 19a', 19b' on a second swivelling-lever part 19' on the second axle 16.

Other important differences are the elimination of the connecting rod 25 or 25' and the replacement of the two torsion springs 31a, 31b (according to FIGS. 4a to 4c) by a single torsion spring 31, which acts on a special spring-action lever 41 welded to the second axle 16.

The structure of the lower swivelling-lever mechanism can best be seen in FIG. 5b. The axle 16, shown here without the bushings 16a, 16b, bears near its one end (on the left in the drawing) the torsion spring 31, which has been pushed onto the axle 16 coaxially and with its one end is braced against the upper edge of the spring-action lever 41 while the other end—as can be seen in FIG. 5a and is analogous to the embodiment according to FIGS. 4a to 4c—is fixed to the seat-back frame.

In the middle region, a bore 16c passes radially through the axle 16. A restoring lever 37 constructed as in the preceding embodiment is welded to a short tubular section 15' and together with the latter can be pushed onto the axle 16. Here, again, the end 33a of the Bowden cable 33 is fixed in a bore 37b in the restoring lever 37 in order to actuate the latter. Next to the tubular section 151, on the right in the Figure, the second swivelling-lever part 191 is also pushed onto the axle 16. This likewise comprises a radial bore 19c', which is aligned with the bore 16c through the axle 16 so that the lower swivelling mechanism can be mounted. By insertion of a pin 43 the second swivelling-lever part 19' is connected to the axle 16 in a manner fixedly rotating therewith.

It will be understood that the abutments on the cushion carrier part 5 must be modified from the arrangement shown in FIG. 4a to correspond to the changed positions of the swivelling levers on the movement mechanism.

Figures 6A, 6B:
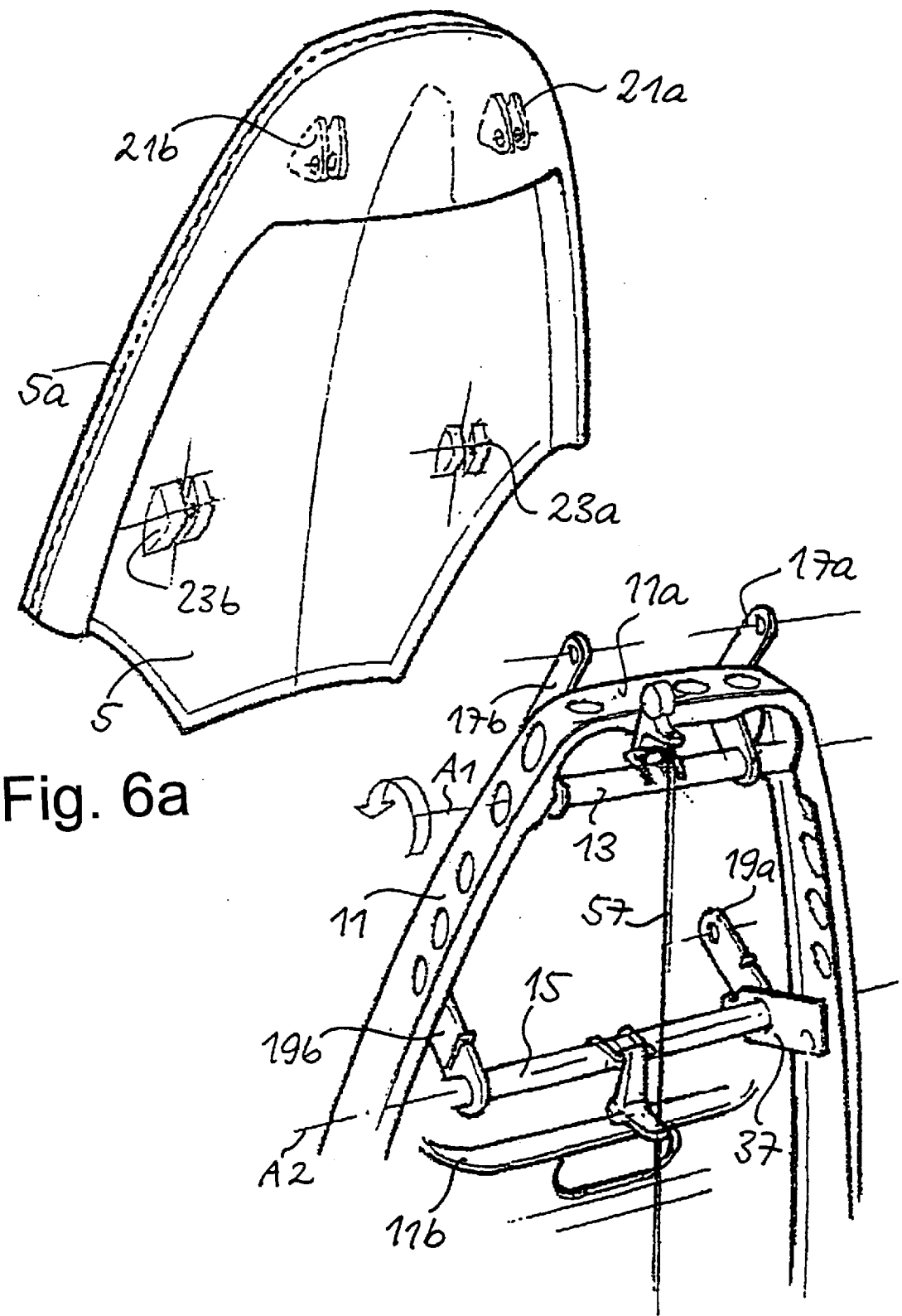
Figure 6C:
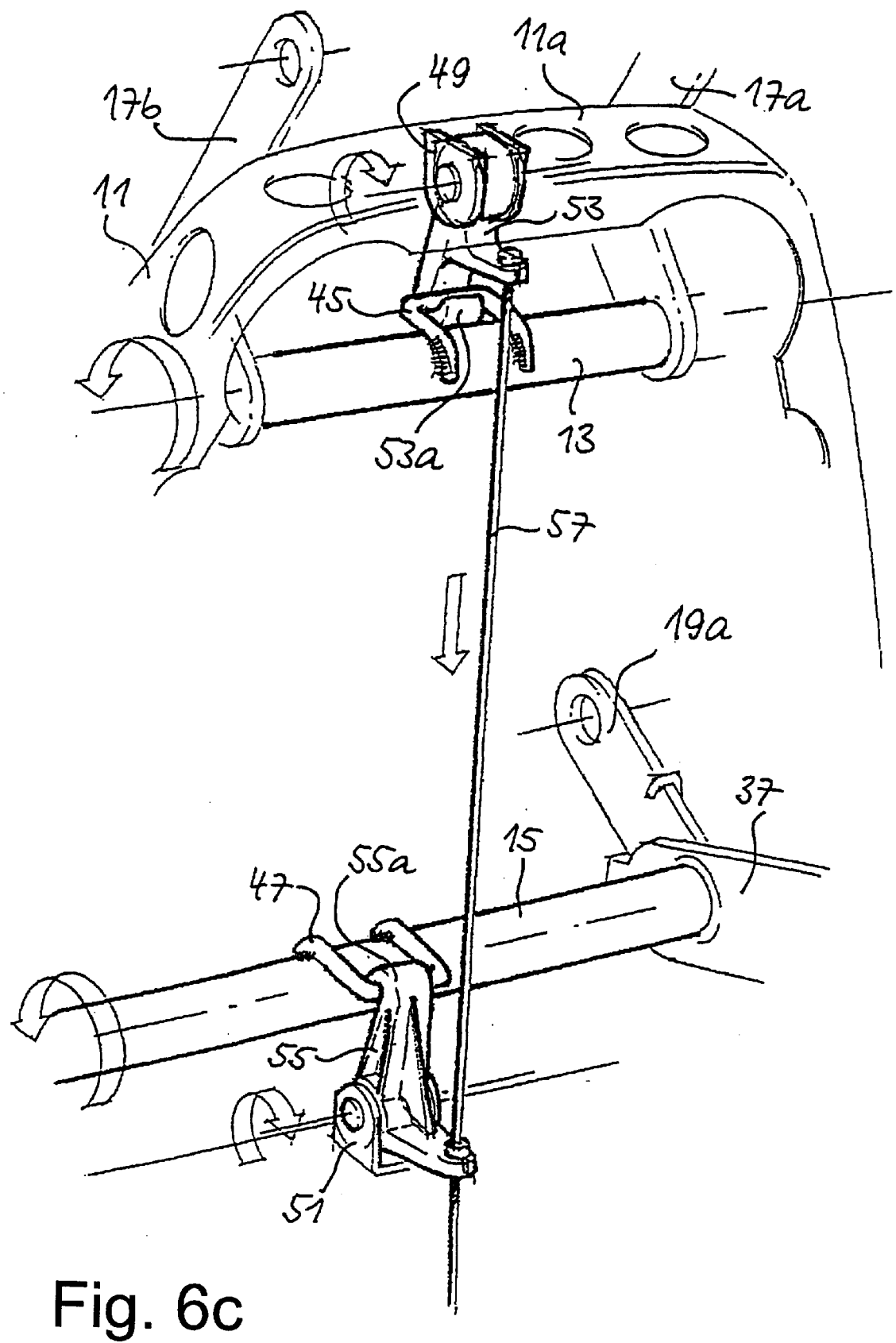

FIGS. 6a to 6c show a fragmentary view of an embodiment that differs from the embodiment according to FIGS. 4a to 4c with respect to the retaining mechanism. The actual movement mechanism corresponds to that according to FIGS. 4a to 4c, and its components (insofar as they have not been omitted entirely in FIGS. 6b and 6c to make clearer what is shown) are identified by the same numerals as in those figures and are not explained again here.

The substantial alteration is that on the cushion carrier part 5 there is no retaining means; instead, this part is locked in place entirely by way of the swivelling-lever mechanism itself. The construction involved here is best seen in FIG. 6c. Onto the tubular section 13, which bears the angled swivelling levers 17a, 17b, a first wire clamp 45 is welded, and a second wire clamp 47 is welded onto the tubular section 15, which bears the straight swivelling levers 19a, 19b. To the upper horizontal section 11a of the seat-back frame 11 is attached a first retaining-lever holder 49, and to a cross-bar 11b of the seat-back frame 11, near the second axis of rotation A2, a second retaining-lever holder 51 is attached.

Within each of the two retaining-lever holders 49, 51 is seated—by way of a torsion-spring element—a retaining lever 53 or 55, respectively, which is so disposed and constructed as to engage with the first wire clamp 55 on the tubular section 13 or the second wire clamp 47 on the tubular section 15. For this purpose there is provided on each retaining lever a catch section 53a or 55a, respectively, that can hook into the wire clamp 45 or 47, respectively.

The retaining levers 53, 55 each comprise an extension 53b or 55b, respectively, in each of which a guide hole (not specially numbered) is provided within which a traction wire 57 is held and fixed to the retaining lever 53, 55 so that it cannot be pulled out.

When the traction wire 57 is moved in the direction of the arrow shown in its vicinity in FIG. 6c, the retaining levers 53, 55 are pivoted clockwise against the spring force of their individual torsional seating elements, so that the catch section 53a, 55a of each of them is disengaged from the associated wire clamp 45, 47. The swivelling-lever mechanism is thus disengaged and, as in the embodiment according to FIGS. 4a to 4c, can bring about a forward rotation and lowering of the cushion carrier part 5 under the action of the torsion springs provided on the lower axle.

Figure 7A:
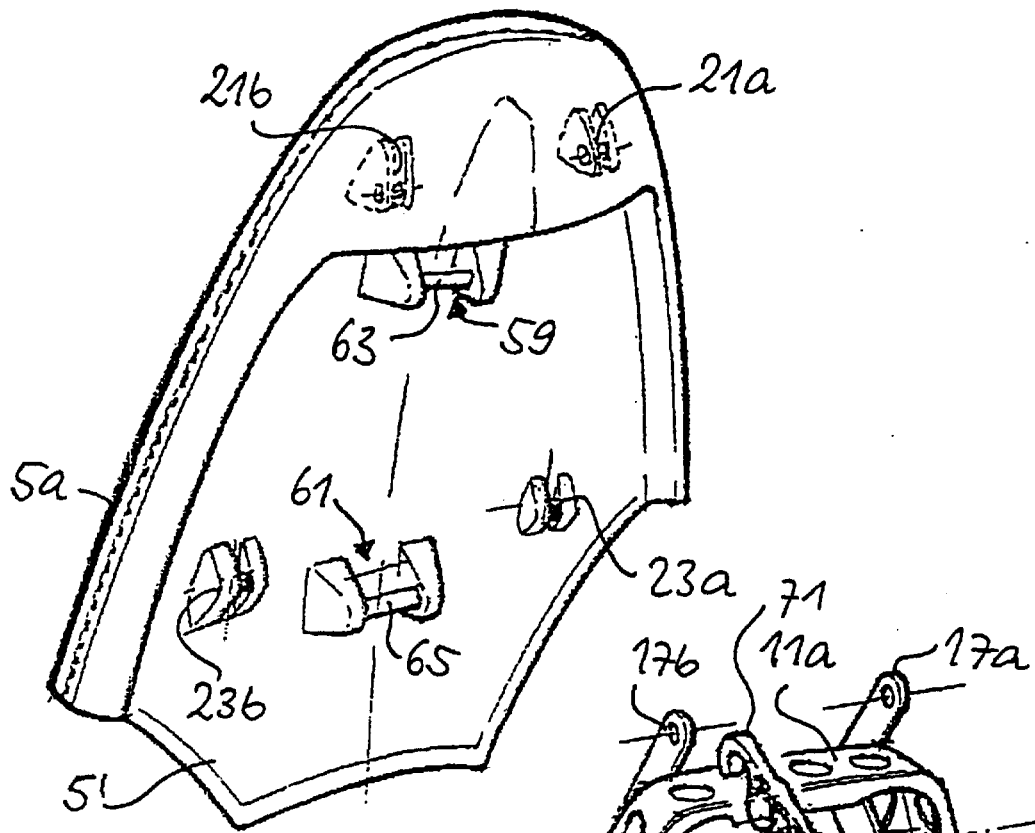
FIGS. 7a to 7c are perspective partial views to explain the mechanical construction of the headrest section of a vehicle seat according to a third embodiment of the invention.
Figure 7B:
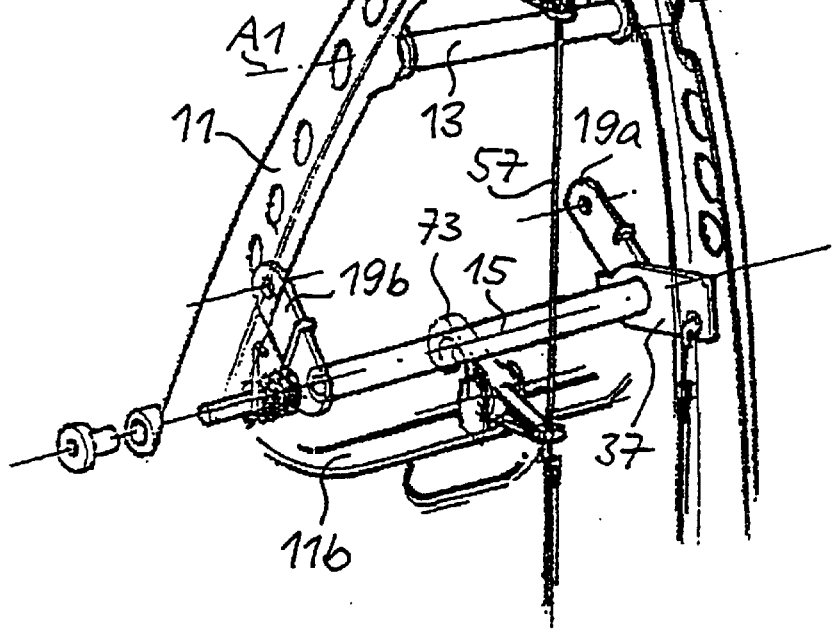
Figure 7C:
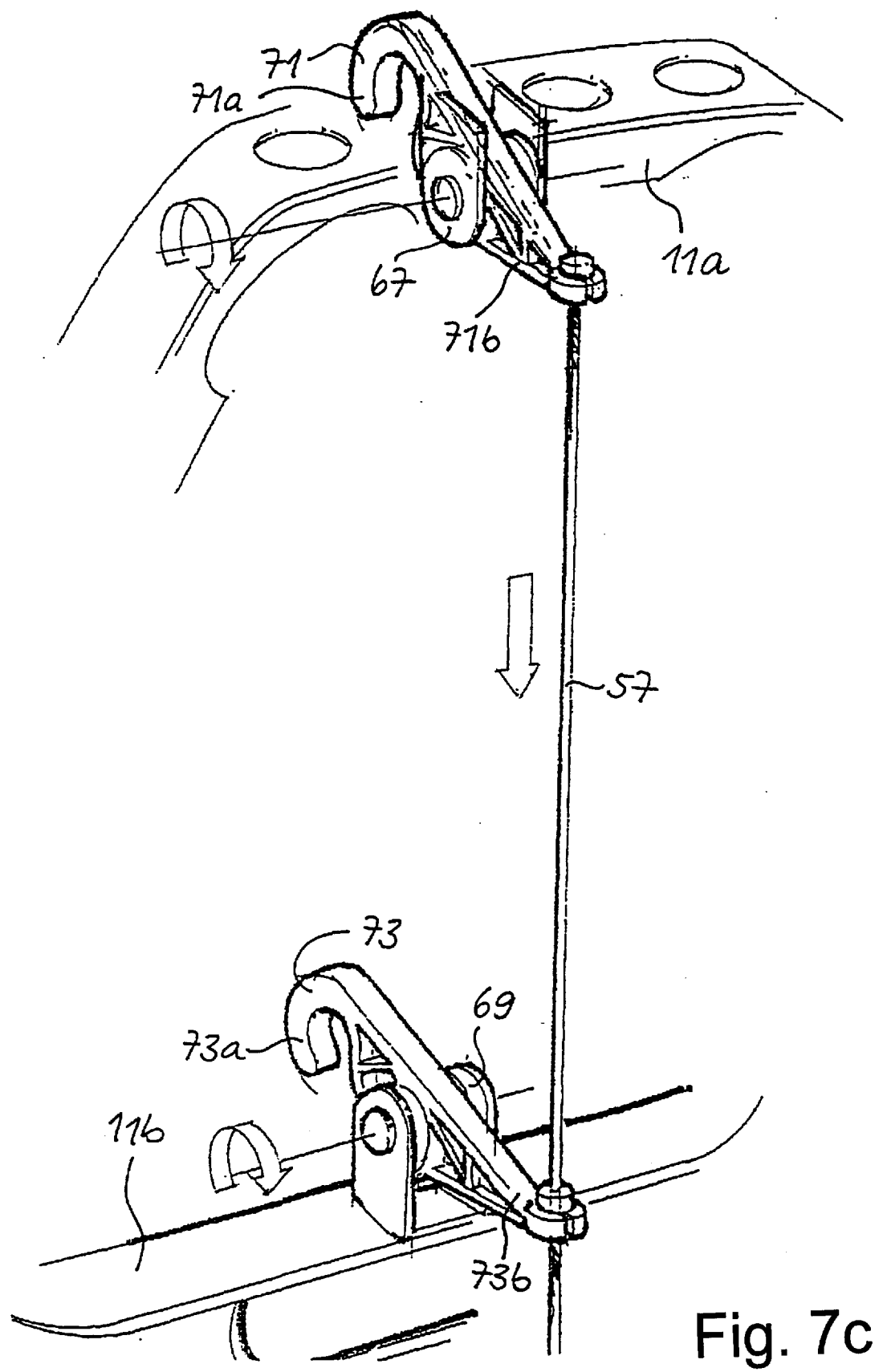

A further modified embodiment of the retaining mechanism is sketched in FIGS. 7a to 7c. Here, again, the actual swivelling mechanism corresponds to the mechanism shown in FIGS. 4a to 4c and described above, so that here again the same reference numerals are used and the corresponding components are not explained again.

The substantial difference from the embodiment according to FIGS. 4a to 4c and FIGS. 6a to 6c is, firstly, that a modified cushion carrier part 5' is used which, in addition to the abutments 21, 21b, 23, 23b for the swivelling levers, comprises two pairs of holders 59, 61 for a first and a second retention pin 63, 65. Corresponding to the arrangement of the retention pins 63, 65 on the cushion carrier part 5', retaining-lever holders 67, 69 for retaining levers 71, 73 are mounted on the seat-back frame 11, one on the upper horizontal section 11a and the other on the lower cross-bar 11b.

In an arrangement similar to that in the embodiment according to FIGS. 6a to 6c, the retaining levers 71, 73 are seated in the retaining-lever holders 67, 69 by way of torsion-spring elements and comprise hook-shaped catch sections 71a, 73a and —on the other side of the fulcrum— extending sections 71b, 73b at which the traction wire 57 acts.

The function of the retaining mechanism in the present arrangement to a great extent corresponds to that in the arrangement according to FIGS. 6a to 6c—with the difference that the retaining levers 71, 73 do not engage with wire clamps on the rotatable tubular sections of the linkage mechanism, but rather hook behind the retention pins 63, 65 on the back surface of the cushion carrier part 5', and are disengaged at these sites by movement of the traction wire in the direction of the arrow.

Figure 8A:
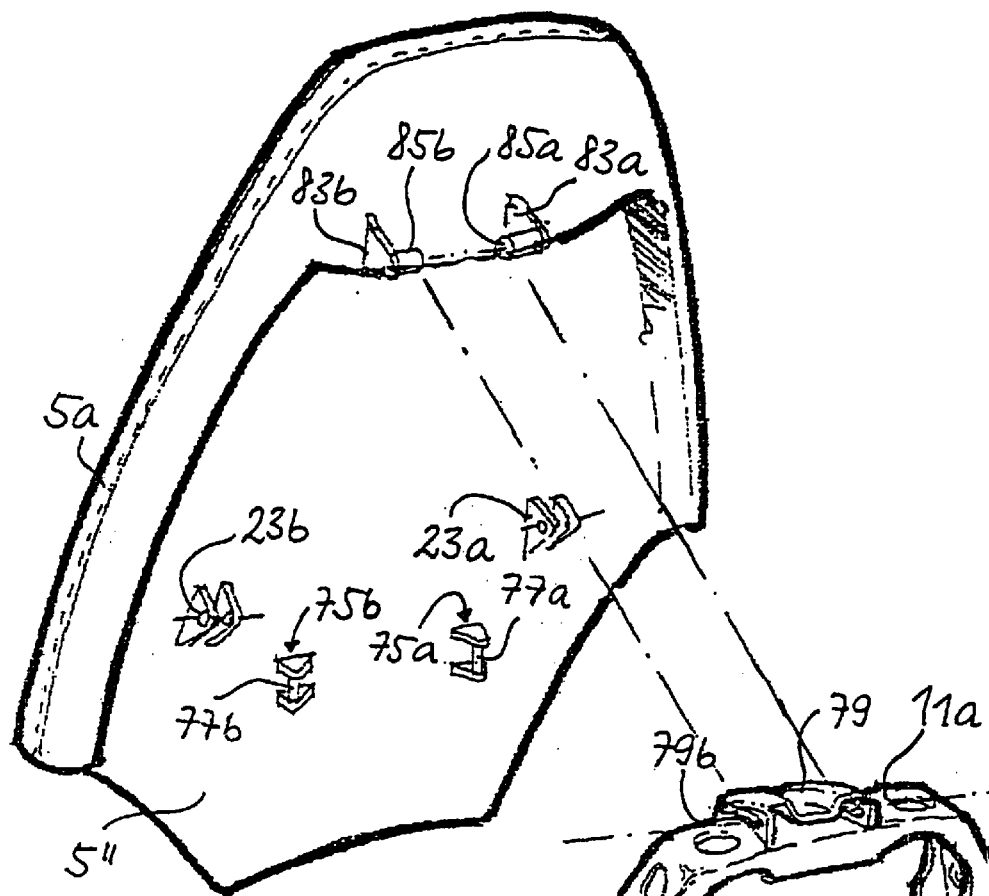
FIGS. 8a to 8c are perspective partial views to explain the mechanical construction of the headrest section of a vehicle seat according to a fourth embodiment of the invention.
Figure 8B:
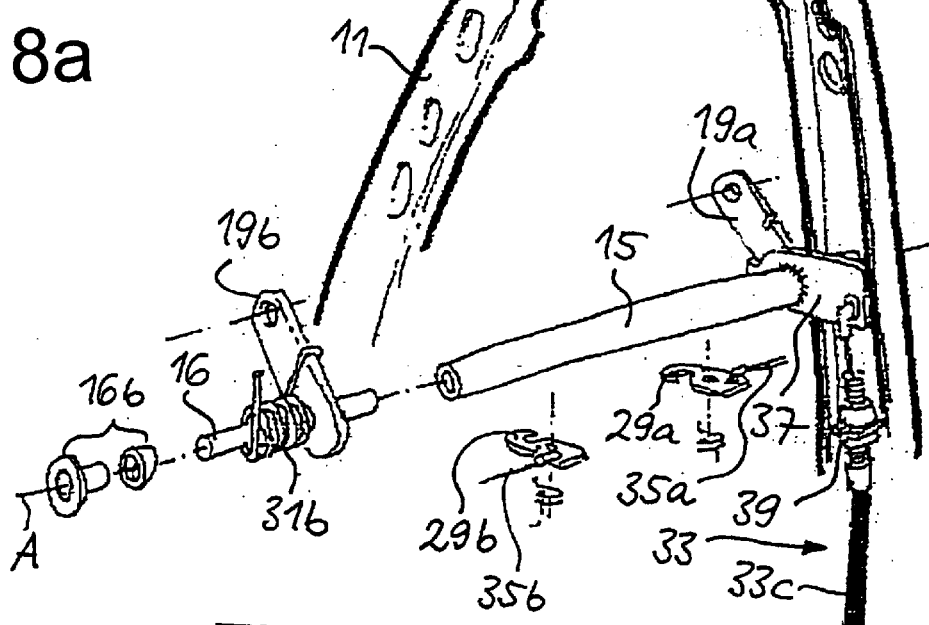
Figure 8C:
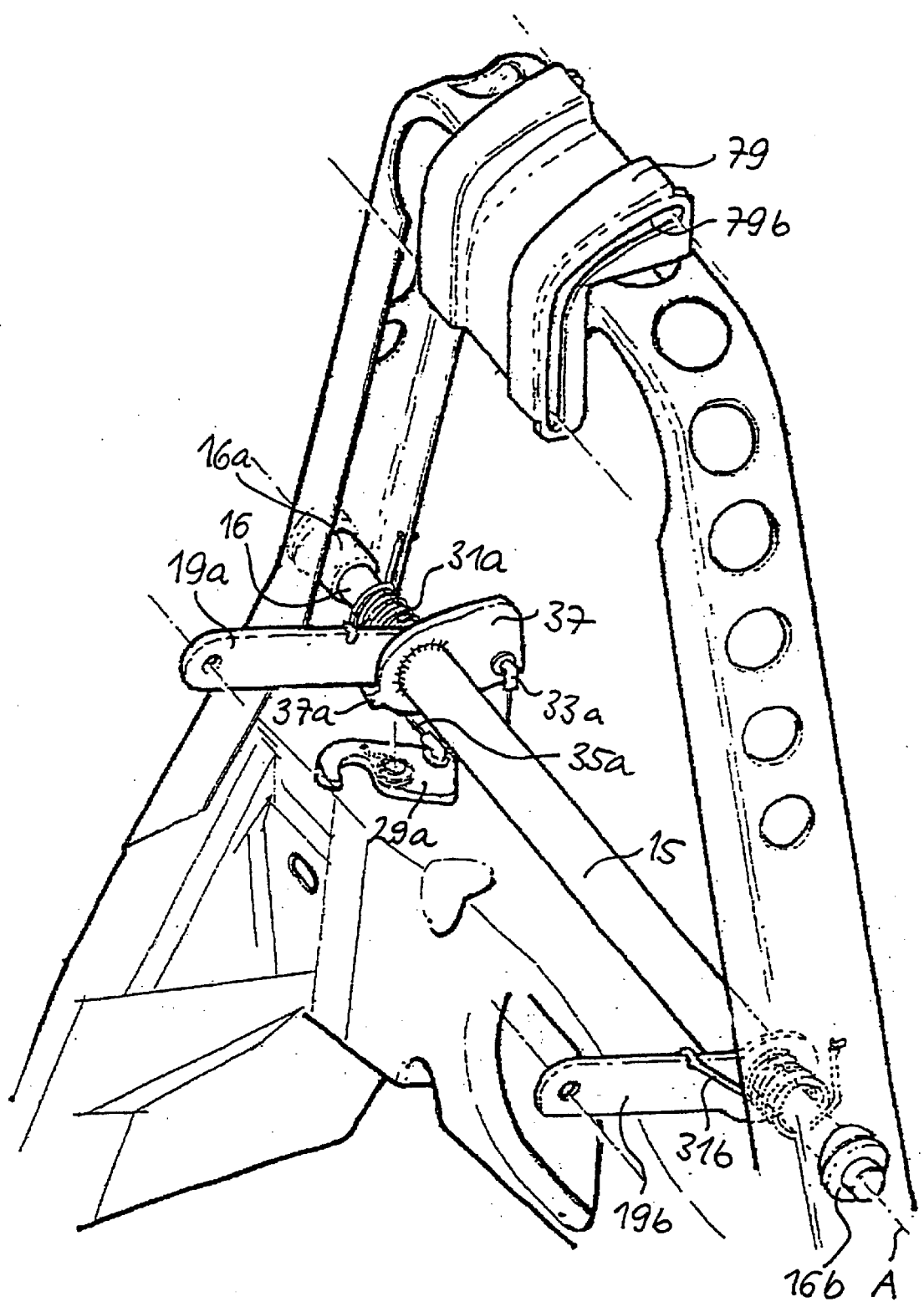

In FIGS. 8a to 8c is shown a further movement mechanism for embodying the invention, namely a combined pivot-and-slide mechanism. Another retaining mechanism is also sketched here. Insofar as the individual elements correspond to those in the embodiments described above, they are identified by the same reference numerals as above and are not described again here.

The arrangement comprises, firstly, a cushion carrier part 5" with a headrest cushion 5a, on the back surface of which the abutments 23a, 23b present in the previously described embodiments are again provided. In addition two pairs of holders 75a, 75b for retention pins 77a, 77b are provided, which—in contrast to the embodiment shown in FIG. 7a—are oriented substantially vertically and are both disposed below the abutments 23a, 23b. In the upper region of the cushion carrier part 5" there are provided at the same level two holders 83a, 83b with guide pins 85a, 85b that point toward one another and are aligned on a common axis.

As can be seen in FIG. 8b, the lower part of the movement mechanism has practically the same structure as in the embodiments described previously (cf. in particular FIG. 4b); here, however, the construction is illustrated by an exploded drawing. In a position corresponding to the retention pins 77a, 77b on the cushion carrier part 5" there are provided on the seat-back frame (by way of holders not shown in detail here) two retaining clips 29a, 29b to engage the retention pins. These are actuated by means of Bowden cables 35a, 35b.

On the upper side of the upper horizontal section 11a of the seat-back frame a guide gate 79 is mounted; it comprises two lateral guide grooves, of which only the groove 79b is visible in the drawings. The guide pins 85a, 85b on the cushion carrier part 5" extend into these grooves and slide within them when the swivelling levers 19a, 19b pivot about the axis of rotation A, thus guiding the upper section of the cushion carrier part in a movement that corresponds to the swivelling movement of the lower section.

The cushion carrier part 5" is locked in place and released by means of the retaining clips 29a, 29b and the retention pins 77a, 77b in basically the same way as in the embodiment according to FIGS. 4a to 4c—with the difference that in the embodiment described here two retention mechanisms are provided.

Figure 9A:
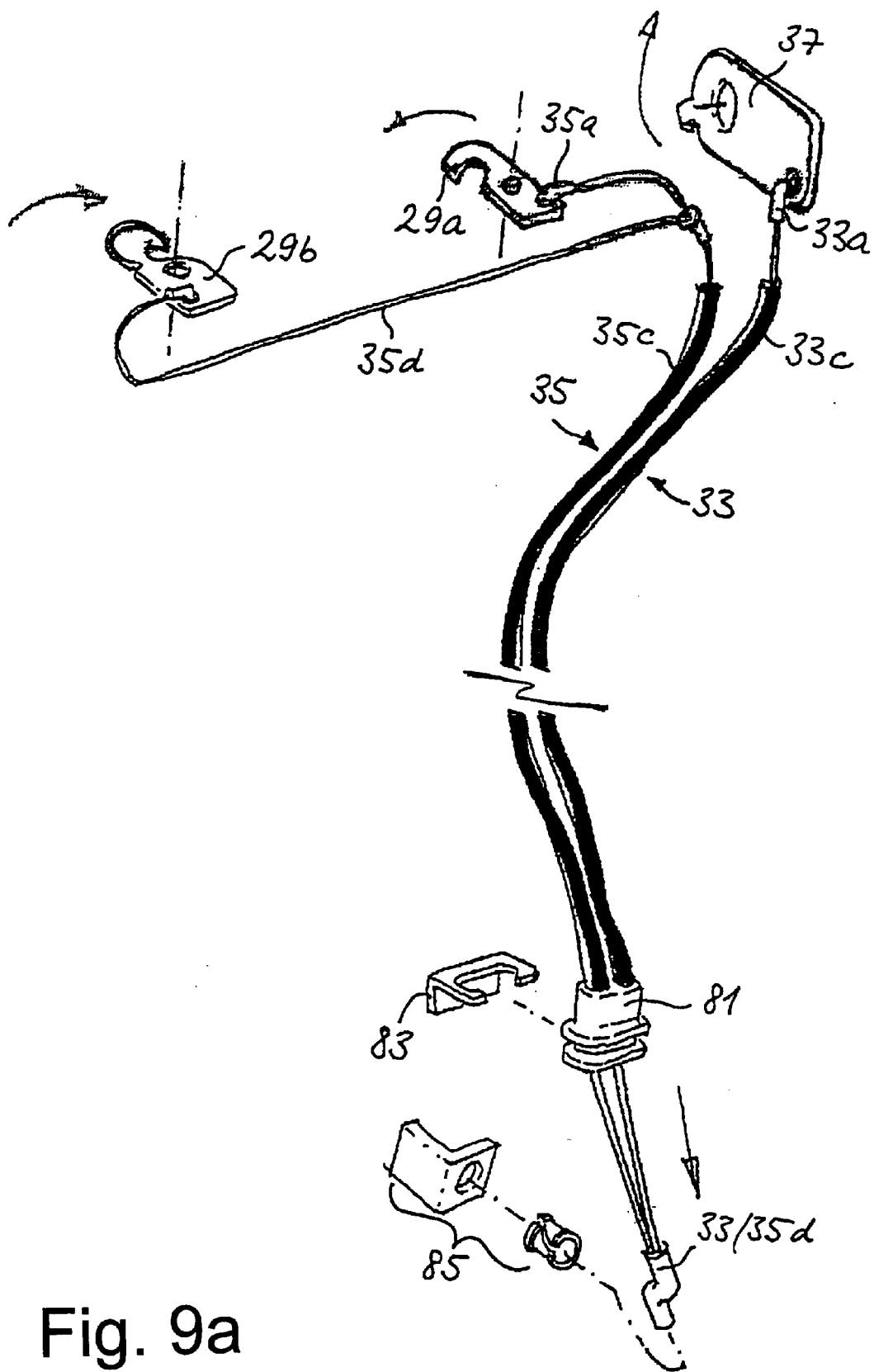
FIGS. 9a to 9c are detail views to explain the actuating mechanism for movement of the cushion carrier part of the headrest for a vehicle seat according to one embodiment of the invention.
Figure 9B:
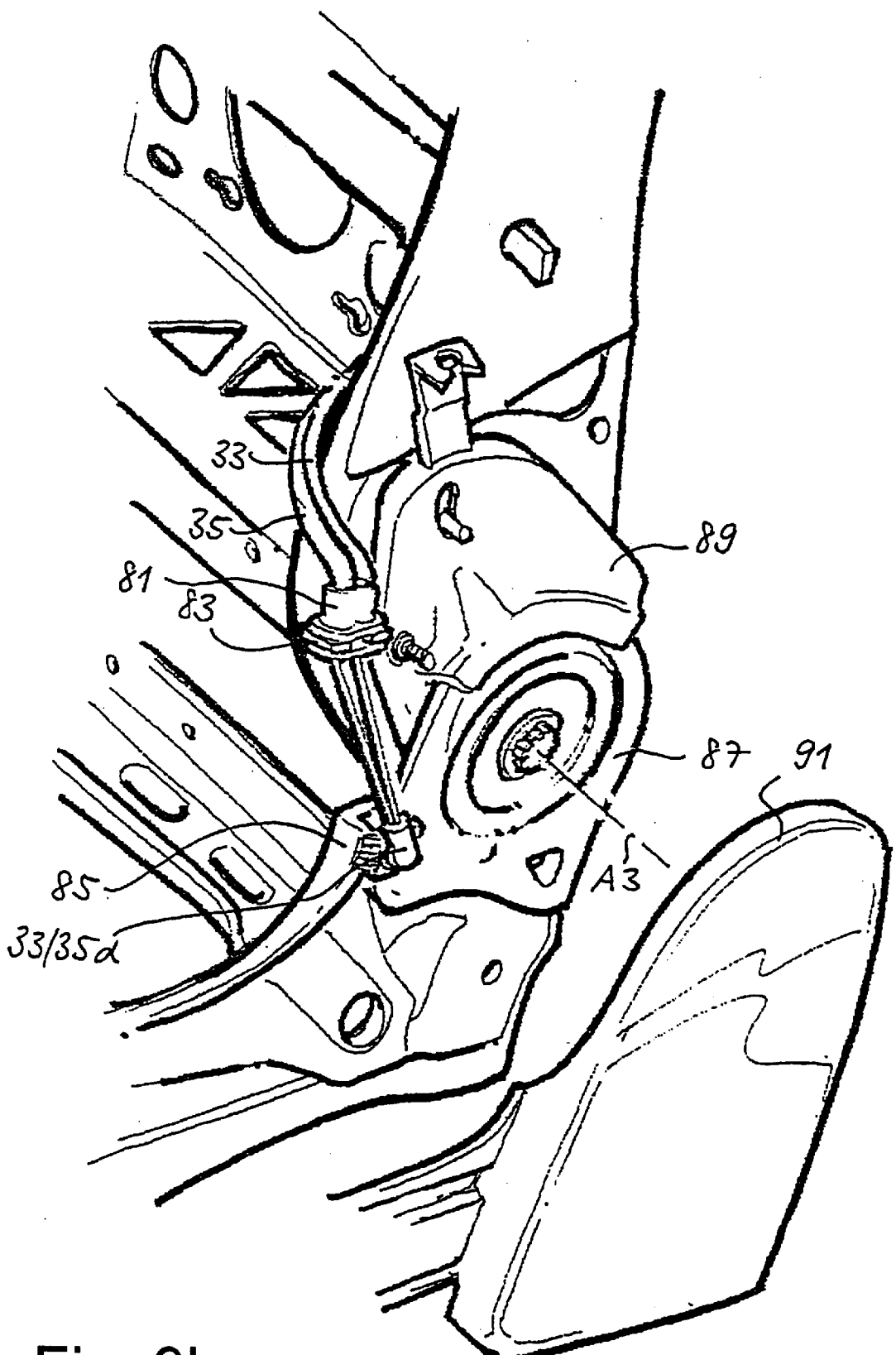
Figure 9C:
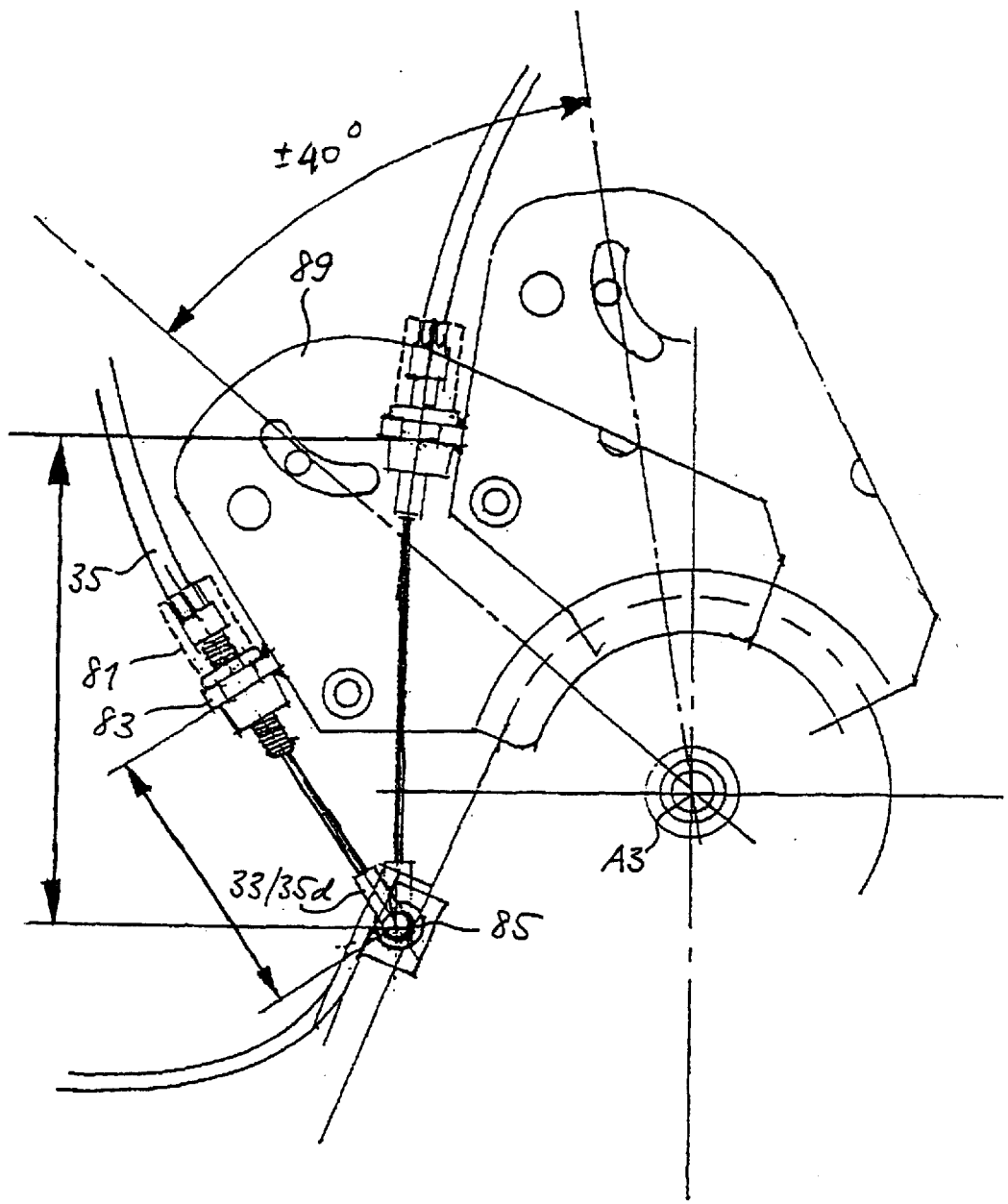

In FIGS. 9a to 9c an embodiment of a Bowden cable actuating mechanism for the arrangements explained above is sketched. Regarding FIG. 9a special reference is made to the last-described embodiment of the movement mechanism, as shown in FIGS. 8a to 8c.

FIG. 9a, firstly, shows schematically the the entire course of the Bowden cables 33 and 35 for actuation of the restoring lever 37 and the retaining clips 29a, 29b, respectively. The arrangement of the Bowden cables 33, 35 with respect to these components of the movement and locking mechanisms was explained above.

In FIG. 9a, however, it can be seen in addition that at the upper end of the Bowden cable 35 is provided a cable extension 35d for connection with the retaining clip 29b. At the ends of the Bowden cables 33, 35 away from the movement and retention mechanism the two cables are held together in a cable-connecting part 81, which is set into a Bowden cable holder 83.

The ends of the two Bowden cables that project beyond the cable-connecting part are fixedly joined to one another in a cable-end coupling 33/35e, which is inserted into a cable-end fastening 85. This arrangement creates a stable reference point for the actuating mechanism.

As can be seen in FIGS. 9b and 9c, the Bowden cable-end fastening 85 containing the cable-end coupling 33/35d is attached to a fixed seat-back mounting part 87, and the Bowden cable holder 83 containing the cable-connecting part 81 is attached to a seat-back mounting part 89 that can pivot about a seat-back axis of rotation A3. Both seat-back mounting parts 87, 89 and the hinge-sided ends and fixation elements of the Bowden cables 33, 34 are covered by a snap-on cap 91.

In FIG. 9c the pivotable seat-back mounting part 89 and the hinge-sided components of the Bowden cable mechanism are shown in two different positions of the seat back, at an angle of 40° to one another. It can be seen here that when the seat back is pivoted out of the upright position into a tilted-forward position, the original tension on the Bowden cable 35 (shown here as an example) is relieved, whereas when the back is returned to the upright (resting) position, the cable is again placed under tension.

The result is movement of the various elements as described above, namely rotation of the retaining clips 29a, 29b about their vertical axes and of the restoring lever 37 about its horizontal axis (in each case against the pretensioning force of the associated torsion springs), and hence the disengagement and lowering, or raising and engagement of the lowerable cushion carrier part of the headrest.

The performance of the invention is not limited to the examples described above, but can be achieved in diverse modifications that are within the abilities of those skilled in the art.

In particular, a lowering of the separate part of the headrest with respect to the seat-back frame can also be accomplished by means of a pure sliding guide mechanism or in principle also by means of a simple, single-axis tilting mechanism. The sliding or folding over of the separate headrest part can be performed manually in an especially simple embodiment.

The disengagement can also be brought about by way of the unlocking lever of the seat back or else a separate unlocking element. Instead of attaching the actuating mechanism to the seat back or the hinge of the seat back as described above, an attachment adjacent thereto is also possible, such that the seat back or its movable hinge part acts on the adjacently disposed actuating element when the seat back is tilted forward.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle seat comprising:
   a seat back being pivotably mounted for movement between a generally upright position for occupant seating and a forward tilted position; and
   a headrest having a cushion carrier part movably mounted on said seat back such that said cushion carrier part is movable between a resting position for use when said seat back is in said upright position, and a second position in which said cushion carrier part is positioned in a forward and lower manner relative to said resting position when said seat back is moved to said forward tilted position to effectively reduce the overall length of the combination of said seat back and said headrest, wherein said seat back includes means mounted thereon to move said cushion carrier part to said second position, as the seat back is tilted forwardly.

2. The vehicle seat of claim 1, wherein said seat back includes a frame, and wherein said headrest is integrated into said seat back such that said headrest is positioned in front of an upper portion of said frame, thereby forming an upper frontal portion of said seat back.

3. The vehicle seat of claim 2, wherein said headrest forms a tapered extension of said seat back.

4. The vehicle seat of claim 1, wherein said headrest is movable between said resting and second positions by a sliding connection between said cushion carrier part and a frame of said seat back.

5. The vehicle seat of claim 1, wherein said headrest is movable between said resting and second positions by a pivoting connection between said cushion carrier part and a frame of said seat back.

6. The vehicle seat of claim 1, wherein said headrest is movable between said resting and second positions by a combination of a sliding connection and a pivoting connection between said cushion carrier part and a frame of said seat back.

7. The vehicle seat of claim 1 including an actuating element mounted on said seat back to move said cushion carrier part.

8. The vehicle seat of claim 7 including an unlocking element for locking and unlocking said seat back in said upright position, and wherein said actuating element is connected to said unlocking element such that said actuating element responds to the unlocking of said seat back from said upright position.

9. The vehicle seat of claim 7, wherein said actuating element is disposed in relation to said seat back that said actuating element responds to a tilting of said seat back through an angle exceed a predetermined value.

10. The vehicle seat of claim 7, wherein a cable element connects said actuating element to said cushion carrier part.

11. The vehicle seat of claim 7, wherein said actuating element includes a catch connection between said seat back and said cushion carrier part for locking said cushion carrier part relative to said seat back when said cushion carrier part is in said resting position, and wherein said catch mechanism is disengaged by way of said actuating element.

12. The vehicle seat of claim 1 including a spring element disposed between said seat back and the cushion carrier part for supporting a movement of said cushion carrier part relative to said seat back by a spring action at least in one segment of the path of said cushion carrier part.

13. The vehicle seat of claim 5, wherein said pivoting connection is implemented as a linkage connection, which comprises a first and a second shaft disposed substantially horizontally in a frame of said seat back, and wherein a free end of at least one swiveling lever is rotatably received in an abutment on said cushion carrier part, and the other end of said swiveling lever is attached to one of said first and second shafts.

14. The vehicle seat of claim 13 includes a first swiveling lever on said first shaft which is connected to a second swiveling lever on said second shaft by way of a connecting rod.

15. The vehicle seat of claim 6, wherein said seat back and said cushion carrier part are connected by way of a combined pivoting and sliding connection which comprises a shaft with at least one swiveling lever having a free end which is rotatably accommodated in an abutment on said cushion carrier part.

16. The vehicle seat of claim 13 including a cable element acting on said swiveling lever and is connected thereto in a manner fixedly rotating therewith in at least one direction of rotation and is rotatable about the axis of rotation associated with said swiveling lever.

17. The vehicle seat of claim 1, wherein said cushion carrier part is connected to a frame of said seat back over the outer circumferential region of said cushion carrier part by way of a flexible cuff.

* * * * *